(12) United States Patent
Ahmadloo (10) Patent No.: US 11,264,712 B2
(45) Date of Patent: Mar. 1, 2022

(54) RADAR SENSOR WITH RADOME HAVING TRENCHES FOR REDUCING COUPLING BETWEEN TRANSMIT AND RECEIVE ANTENNAS

(71) Applicant: Veoneer US, Inc., Southfield, MI (US)

(72) Inventor: Majid Ahmadloo, Lowell, MA (US)

(73) Assignee: VEONEER US, INC., Southfield, MI (US)

( * ) Notice: Subject to any disclaimer, the term of this patent is extended or adjusted under 35 U.S.C. 154(b) by 18 days.

(21) Appl. No.: 16/448,302

(22) Filed: Jun. 21, 2019

(65) Prior Publication Data

US 2020/0403307 A1  Dec. 24, 2020

(51) Int. Cl.
*H01Q 1/32*  (2006.01)
*H01Q 1/42*  (2006.01)
(Continued)

(52) U.S. Cl.
CPC ........... *H01Q 1/525* (2013.01); *H01Q 1/3233* (2013.01); *H01Q 1/38* (2013.01); *H01Q 1/42* (2013.01); *H01Q 21/065* (2013.01)

(58) Field of Classification Search
CPC ..... H01Q 1/32–3291; H01Q 1/42–428; H01Q 1/52–525; H01Q 21/06;
(Continued)

(56) References Cited

U.S. PATENT DOCUMENTS

| 6,937,184 B2 * | 8/2005 | Fujieda | G01S 7/03 |
| | | | 342/1 |
| 8,674,899 B2 * | 3/2014 | Ando | H01Q 1/525 |
| | | | 343/872 |

(Continued)

FOREIGN PATENT DOCUMENTS

| DE | 10240494 A1 | 3/2004 |
| DE | 102017125243 A1 | 5/2018 |

(Continued)

OTHER PUBLICATIONS

International Search Report and Written Opinion for International Application No. PCT/US2020/027653 dated Jul. 7, 2020.

*Primary Examiner* — Dimary S Lopez Cruz
*Assistant Examiner* — Patrick R Holecek
(74) *Attorney, Agent, or Firm* — Burns & Levinson LLP; Steven M. Mills (57) ABSTRACT

A radar sensor module includes a substrate, at least one transmit antenna formed on a surface of the substrate, and at least one receive antenna formed on the surface of the substrate. A radome is disposed over the surface of the substrate and the at least one transmit antenna and the at least one receive antenna, such that a gap is located between the surface of the substrate and an underside of the radome in which a portion of radiation emitted from the at least one transmit antenna can propagate. At least one trench is formed in the underside of the radome and is electromagnetically coupled to the gap, the at least one trench being sized, shaped and positioned with respect to the gap such that the portion of radiation emitted from the at least one transmit antenna is substantially prevented from propagating toward the receiving antenna.

17 Claims, 6 Drawing Sheets

(51) Int. Cl.
*H01Q 21/06* (2006.01)
*H01Q 1/52* (2006.01)
*H01Q 1/38* (2006.01)

(58) Field of Classification Search
CPC .... H01Q 21/061; H01Q 21/065; H01Q 21/08; H01Q 21/10
See application file for complete search history.

(56) References Cited

U.S. PATENT DOCUMENTS

| | | | |
|---|---|---|---|
| 10,044,099 B2 | 8/2018 | Leung et al. | |
| 10,085,325 B2 * | 9/2018 | Honda | H05B 47/105 |
| 2008/0105966 A1 * | 5/2008 | Beer | H01L 23/552 |
| | | | 257/690 |
| 2017/0346177 A1 * | 11/2017 | Nagata | G01S 13/931 |
| 2018/0321357 A1 | 11/2018 | Kim | |

FOREIGN PATENT DOCUMENTS

| | | | |
|---|---|---|---|
| JP | 2007013311 A | 1/2007 | |
| JP | 2007201868 A | 8/2007 | |
| JP | 2008107283 A | 5/2008 | |
| JP | 2019041224 A | 3/2019 | |

* cited by examiner

Fig. 5B

RADAR SENSOR WITH RADOME HAVING TRENCHES FOR REDUCING COUPLING BETWEEN TRANSMIT AND RECEIVE ANTENNAS

BACKGROUND

1. Technical Field

The present disclosure is related to radar detection systems and, in particular, to a radar sensor having a radome formed with one or more trenches for reducing coupling between transmit and receive antennas of the radar sensor.

2. Discussion of Related Art

Radar sensor modules, for example, automotive radar sensor modules, typically include at least one transmit (Tx) antenna and at least one receive (Rx) antenna formed on a surface, e.g., top surface, of a substrate, which can be a printed circuit board (PCB). Digital, analog and RF circuitry associated with the sensor can be mounted on the PCB on the same surface as the antennas and/or on the opposite, e.g., bottom, surface. Certain portions of the circuitry can be mounted on one surface, and other portions can be mounted on the opposite surface. For example, the RF and analog circuitry can be mounted on the top surface, and the digital circuitry can be mounted on the bottom surface. Alternatively, the sensor can include a second PCB on which some or all of the associated circuitry can be mounted. Again, for example, the RF and analog circuitry can be mounted on the first PCB with the antennas, and the digital circuitry can be mounted on the second PCB.

In radar sensors, in particular, automotive radar sensors used in automotive radar systems, it is important that the radar sensors be small and compact. As the demand for small size and compactness increases, so does the need to place electronic components in close proximity to each other. As the spacing between electronic components is reduced, interference between the closely packed components can significantly and adversely affect performance of the sensor. This is especially true in the case of the Tx and Rx antennas. For example, radiation emitted by the Tx antenna(s) can be unintentionally picked up by the Rx antenna(s). This undesirable coupled interference can significantly degrade performance of the sensor.

SUMMARY

According to one aspect, a radar sensor module is provided. The radar sensor module includes a substrate, at least one transmit antenna formed on a surface of the substrate, and at least one receive antenna formed on the surface of the substrate. A radome is disposed over the surface of the substrate and the at least one transmit antenna and the at least one receive antenna, such that a gap is located between the surface of the substrate and an underside of the radome in which a portion of radiation emitted from the at least one transmit antenna can propagate. At least one trench is formed in the underside of the radome and is electromagnetically coupled to the gap, the at least one trench being sized, shaped and positioned with respect to the gap such that the portion of radiation emitted from the at least one transmit antenna is substantially prevented from propagating toward the receiving antenna.

In some exemplary embodiments, the substrate is a printed circuit board (PCB).

In some exemplary embodiments, the at least one transmit antenna and the at least one receive antenna are antenna patch arrays formed on the surface of the substrate.

In some exemplary embodiments, the trench is sized, shaped and positioned to act as a waveguide stub electromagnetically coupled to the gap, such that the trench is configured as an electromagnetic stop.

In some exemplary embodiments, the trench is sized, shaped and positioned to act as a waveguide stub electromagnetically coupled to the gap, such that the trench is configured as an electromagnetic stop at an operating frequency of the radar sensor module. The operating frequency of the radar sensor module can be in the range of 76 GHz to 77 GHz. The trench can have a width of approximately 1 mm and a depth of approximately 1.8 mm. The gap can have a height of approximately 1 mm. The radome can have a thickness of approximately 2.5 mm.

In some exemplary embodiments, the operating frequency of the radar sensor module can be in the range of 76 GHz to 78 GHz. The trench can have a width of approximately 1 mm and a depth of approximately 1.8 mm. The gap can have a height of approximately 1 mm. The radome can have a thickness of approximately 2.5 mm.

In some exemplary embodiments, the trench is positioned vertically over the surface of the substrate and laterally between the at least one transmit antenna and the at least one receive antenna.

In some exemplary embodiments, the radar sensor module further comprises a second transmit antenna formed on the surface of the substrate immediately adjacent to the at least one transmit antenna. In some exemplary embodiments, the radar sensor module further comprises a second receive antenna formed on the surface of the substrate adjacent to the at least one receive antenna. The first and second transmit antennas form a group of transmit antennas and the first and second receive antennas form a group of receive antennas, and the trench is positioned vertically over the surface of the substrate and laterally between the group of transmit antennas and the group of receive antennas.

The radar sensor module can be an automotive radar sensor module.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

In radar sensor modules such as automotive radar sensor modules, both transmit (Tx) and receive (Rx) antenna components can be implemented by forming arrays of conductive antenna "patches" on the surface of the PCB. These patches, as well as associated components such as feed lines, strip lines, waveguides and RF transition elements, e. g., waveguide-to-microstrip line transitions, are commonly formed by depositing metal and/or other conductive material on the surface of the PCB in a predetermined desired pattern. A radar sensor module can also include a radome over the antenna components to protect the sensor from external elements such as moisture and other physical contaminants such as road debris. The radome can also impact the radiation and reception properties of the antennas. For example, the radome can be used in shaping the beam to adjust and/or optimize the performance of the sensor.

Radomes are typically placed a predetermined distance over the top surface of the planar patch antennas, the predetermined distance being at least partially determined based on desired sensor performance. In many instances, electromagnetic waves generated by the Tx antenna(s) can be guided and can propagate in the air gap beneath the underside of the radome and can be coupled to adjacent antennas. For certain radome thicknesses and air gap sizes, such guided waves travelling through the air gap between the antenna plane and the sensor radome are major contributors to undesirable electromagnetic coupling between antennas. According to the present disclosure, impeding the propagation of such guided waves significantly reduces high levels of coupling between the Tx and Rx antennas.

A waveguide stub is a length of waveguide which is connected to a waveguide at one end only. A waveguide stub is typically hollow, as is the waveguide, and the open end of the stub is typically connected to the waveguide such that the interior of the waveguide and the interior of the stub are in electromagnetic communication with each other. In some particular configurations, the inner cavity of the stub is electromagnetically connected at a right angle to the central axis of the waveguide via an aperture in the wall of the waveguide. The waveguide stub is typically either short-circuited or open-circuited at its unconnected end, and the dimensions, i.e., length, height and width, of the stub are selected based on the desired effect on the electromagnetic waves propagating through the waveguide.

In the radar sensor module described herein, such as an automotive radar sensor module, the gap between the underside of the radome and the patch antenna plane acts as a waveguide through which interfering electromagnetic radiation propagates between antennas. According to the present disclosure, the underside of the radome is shaped to create one or more cavities in its underside, in the form of one or more trenches, the cavities performing as waveguide stubs connected to the gap. In some exemplary embodiments, each "pseudo waveguide stub" is shaped and sized to perform as a stop filter to prevent the interfering electromagnetic waves from travelling beneath the radome, thus substantially reducing or eliminating undesirable interference between antennas.

Figure 1:
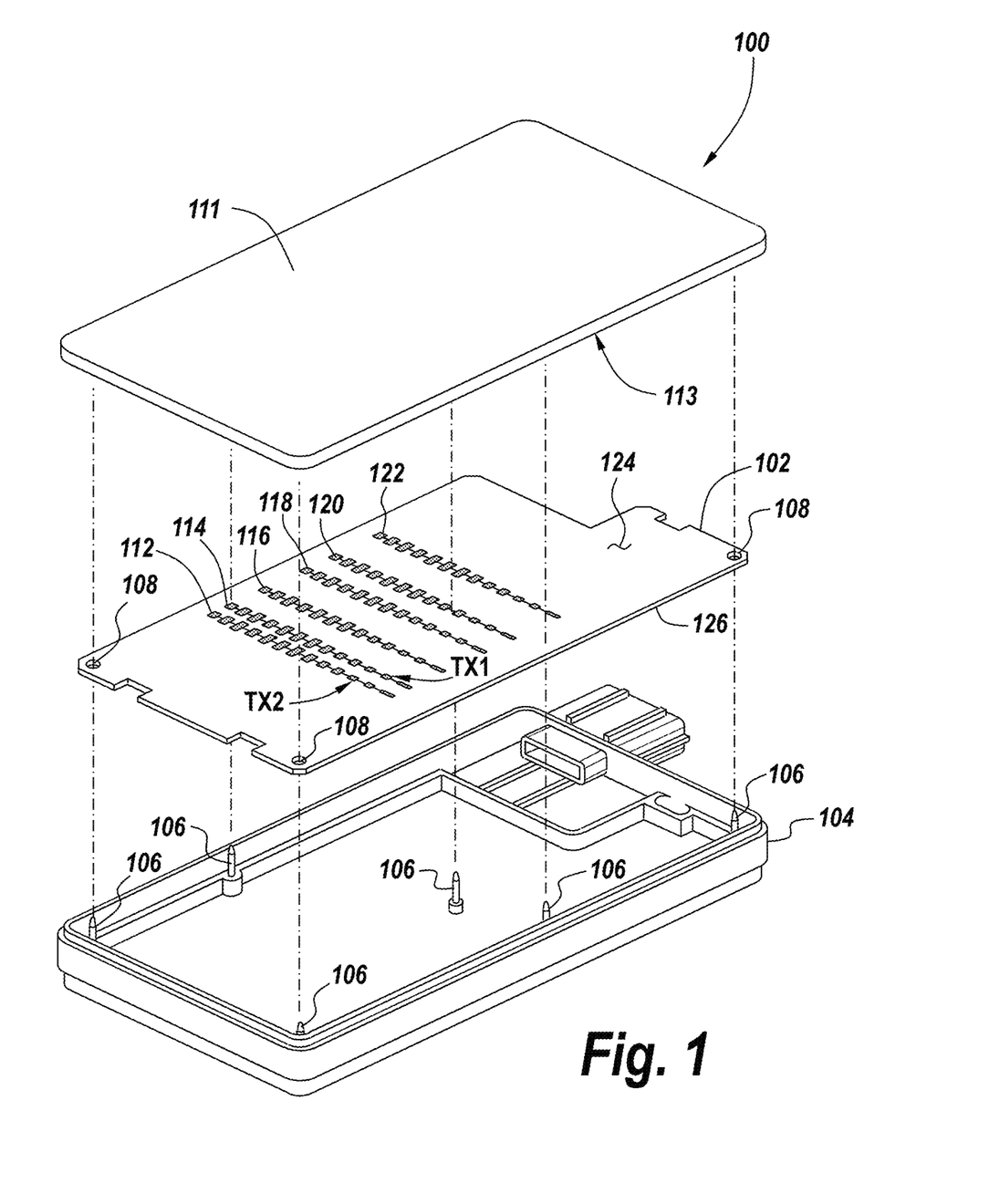
FIG. 1 includes a schematic top perspective exploded view of a radar sensor module, according to some exemplary embodiments.
Figure 2:
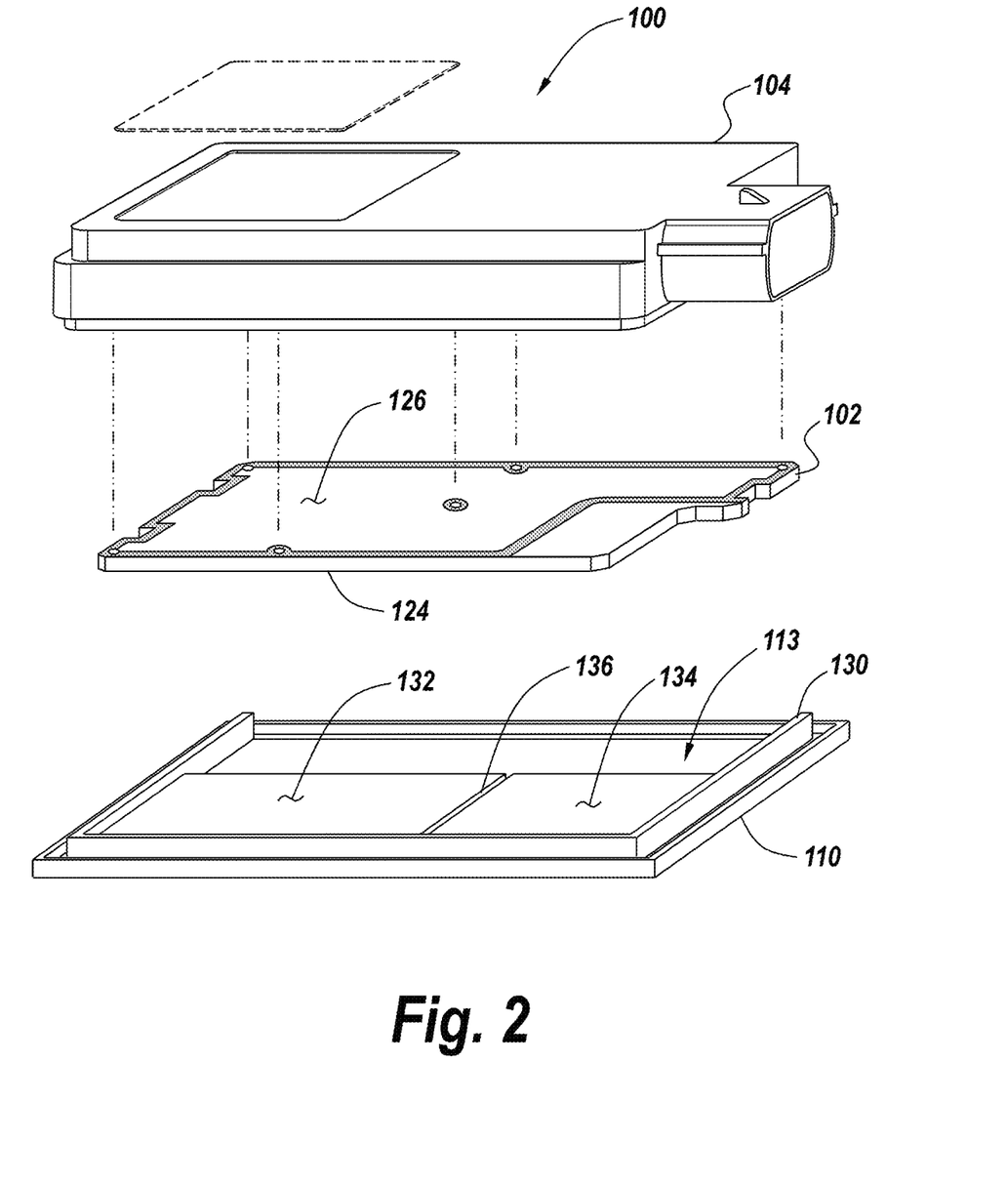
FIG. 2 includes a schematic bottom perspective exploded view of the radar sensor module of FIG. 1, according to some exemplary embodiments.

FIG. 1 includes a schematic top perspective exploded view of a radar sensor module 100, according to some exemplary embodiments. FIG. 2 includes a schematic bottom perspective exploded view of radar sensor module 100, according to some exemplary embodiments. Referring to FIGS. 1 and 2, in some embodiments, radar sensor module 100 is an automotive radar sensor module and, as such, is mountable and operable in an automobile or vehicle. Radar sensor module 100 includes a base or housing 104, which encloses the components of module 100. An electronics substrate 102, which can be, for example, a printed circuit board (PCB), is mounted in housing 104 via alignment posts/stakes 106 and alignment holes 108. A top surface or side 124 of PCB 102 can have formed thereon various electronic components, including, for example, digital, analog and/or RF electronic components. Electronic components can also optionally be formed on bottom surface or side 126 of PCB 102. Electronic components on top and bottom surfaces 124, 126 can be interconnected by conductive vias between layers of PCB 102. As illustrated in FIG. 1, in some exemplary embodiments, the electronic components formed on top surface 124 of PCB 102 can include one or more patch antenna arrays 112, 114, 116, 118, 120, 122 formed by known means, such as deposition of conductive material, e.g., metal, in the desired shape, size and pattern for the desired antenna patch arrays.

In some exemplary embodiments, the antenna patch arrays include both transmit (Tx) and receive (Rx) arrays. In particular, in the exemplary embodiment illustrated in FIG. 1, the antenna arrays include two transmit arrays 112 and 114, referred to herein as arrays TX2 and TX1, respectively. The arrays also include four receive arrays 116, 118, 120, 124 disposed adjacent to transmit arrays 112, 114. In the illustrated embodiment, all of the antenna patch arrays are disposed along antenna axes which are mutually parallel. It will be understood that the antenna patch array configuration illustrated in FIG. 1 is exemplary only; the present disclosure is applicable to any configuration of transmit and/or receive patch antenna array configuration. Sensor module 100 also includes a radome 110 mounted over top surface 124 of PCB 102. Radome 110 can be made of a material which is characterized by RF properties such as low loss and dielectric constant values proportional to the radome thickness. The radome material is also mechanically rigid and has fabrication properties such as weldability and formability. One exemplary material is polybutylene terephthalate (PBT), which is a thermoplastic engineering polymer. The material can be reinforced by glass fiber for further enhancement of its structural integrity.

As can be observed from FIG. 1, with the Tx and Rx antenna patch arrays in such close proximity, interference between the arrays in conventional radar sensors, caused by propagation of transmitted radiation in the air-gap "waveguide" between the patch antenna array plane and the underside of radome 110 can degrade performance of the sensor module. However, in accordance with the present disclosure, as described above, the underside 113 of radome 110 is patterned to create one or more trenches 136, which act as waveguide stubs, which are shaped, sized and positioned to serve as stops to substantially reduce or eliminate interfering radiation from propagating between antenna arrays.

Figure 3:
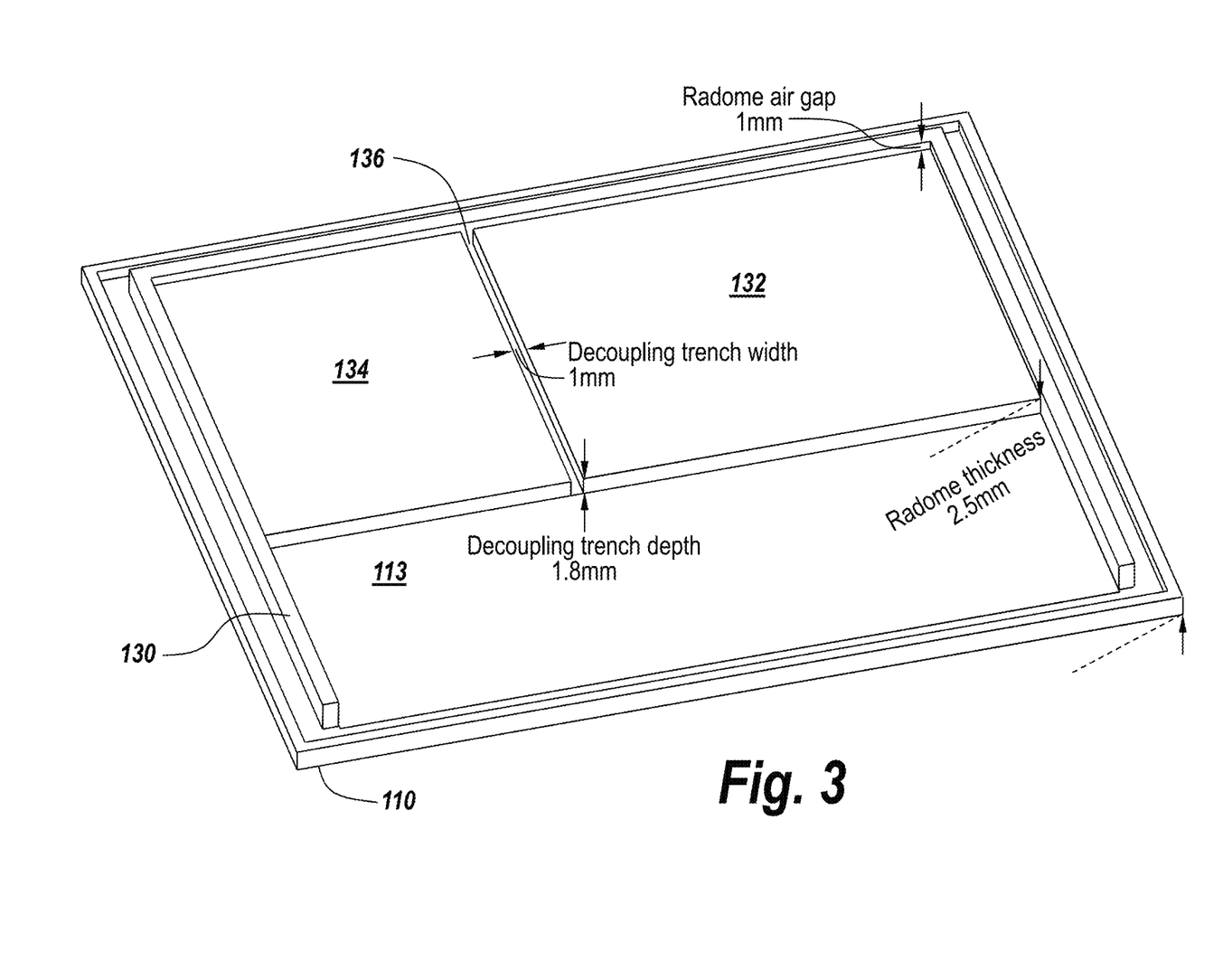
FIG. 3 includes a schematic perspective view of a radome in the radar sensor module of FIGS. 1 and 2, according to some exemplary embodiments.
Figure 4:
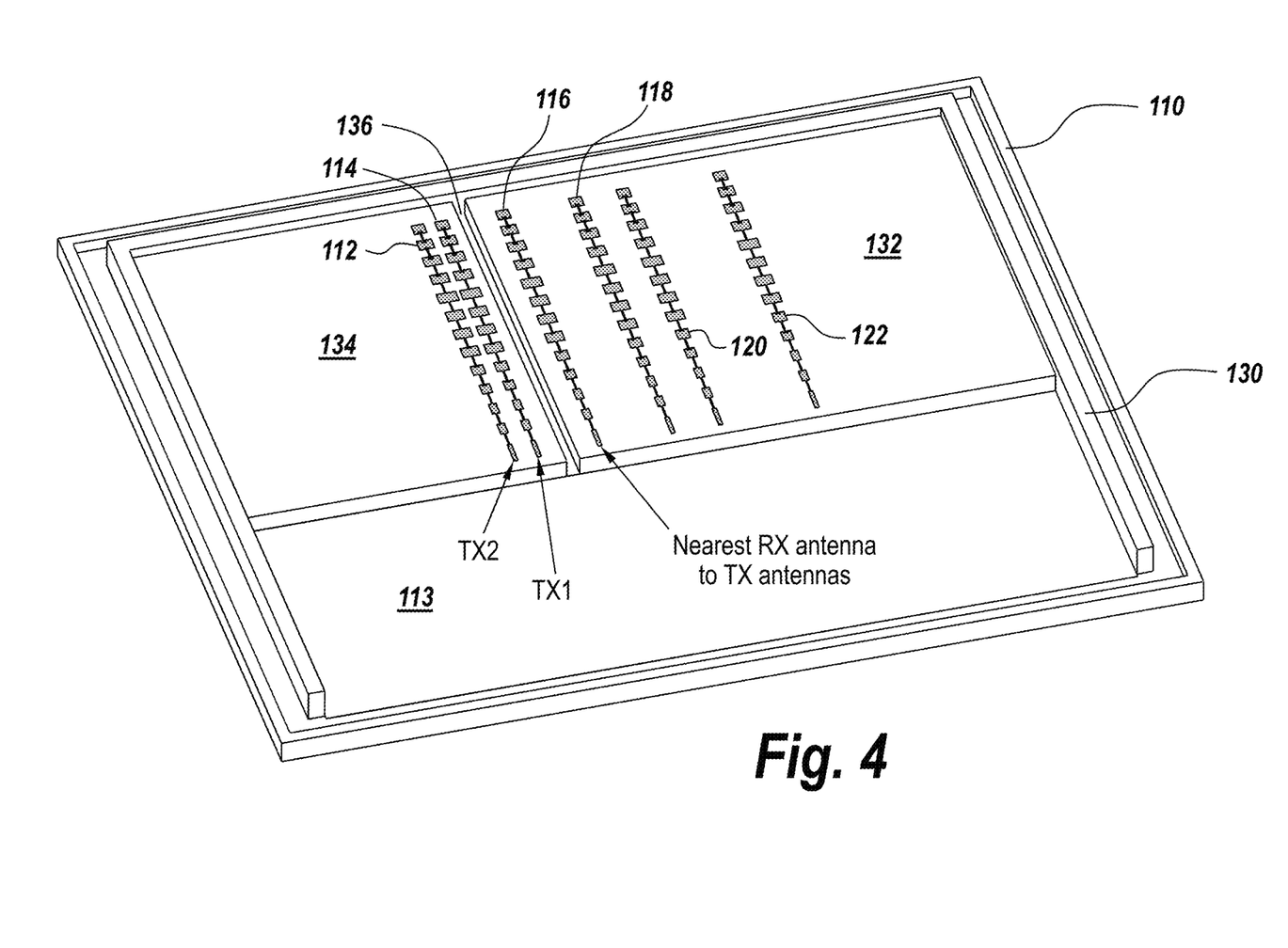
FIG. 4 includes another schematic perspective view of the radome in the radar sensor module of FIGS. 1 and 2, according to some exemplary embodiments.

FIG. 3 includes a schematic perspective view of radome 110, according to some exemplary embodiments. Referring to FIGS. 1 through 3, radome 110 includes a contact mounting surface 130 extending along the perimeter of radome 110. In some exemplary embodiments, when assembled in sensor 100, contact mounting surface 130 contacts the edge of top surface 124 of PCB 102. In other exemplary embodiments, surface 130 contacts housing 104. FIG. 4 includes another schematic perspective view of radome 110, according to some exemplary embodiments. In FIG. 4, the locations of antenna patch arrays 112, 114, 116, 118, 120, 122 projected onto underside 113 of radome 110 to illustrate the relative positioning of antenna patch arrays 112, 114, 116, 118, 120, 122 and waveguide stub trench 136, formed in underside 113 of radome 110 between regions 132 and 134 of radome 110. It is noted that these images of antenna patch arrays 112, 114, 116, 118, 120, 122 do not depict the actual arrays themselves, but rather depict the locations of the arrays projected onto underside of radome 110.

Referring to FIGS. 1 through 4, in some exemplary embodiments, decoupling waveguide stub trench 136 can be located vertically above and laterally between transmit antenna array TX1 114 and first receive Rx antenna array 116. It is noted that, in these exemplary embodiments, decoupling trench 136 is located between transmit antenna array TX1 114 and first receive Rx antenna array 116 because this is where the coupling levels are highest and most destructive for radar detection in radar sensor module 100. Trench 136 has a depth and width selected to provide a stop at the frequency of operation to prevent or substantially reduce radiation at the operation frequency from propagating from transmit antenna array TX1 114 and first receive Rx antenna array 116. For example, in some particular exemplary embodiments, the frequency of operation is nominally 76-77 GHz. At this frequency, the radome can be formed to have a nominal thickness of approximately 2.5 mm, and a radome nominal air gap height of approximately 1 mm is created. Decoupling trench 136 can have a nominal width of approximately 1 mm and a nominal depth of approximately 1.8 mm. In the exemplary embodiments, all of these dimensions are typically held to a tolerance of ±150 μm to achieve optimal performance. Of course, other tolerances can be used, depending on the desired performance. Also, it will be understood that these dimensions and frequencies are exemplary only. For other frequencies, different dimensions can be selected to achieve the desired result, namely, forming a stop to prevent or substantially reduce coupling between the transmit Tx antenna arrays and the receive Rx antenna arrays at the operating frequency of the sensor module.

Figure 5A:
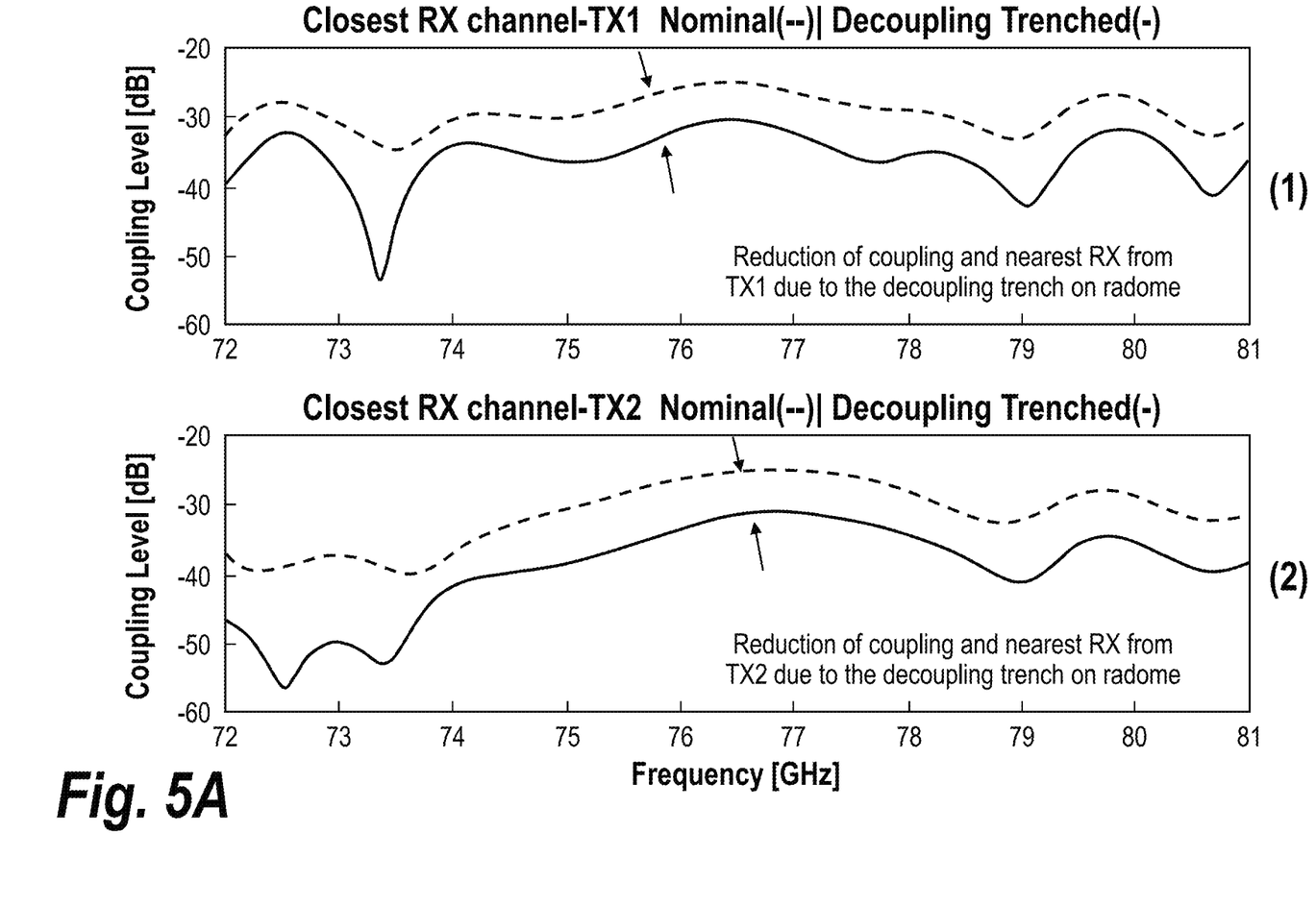
FIGS. 5A and 5B include graphs of experimental results of coupling level between antenna arrays versus frequency, illustrating the decoupling achieved by the technology of the disclosure.
Figure 5B:
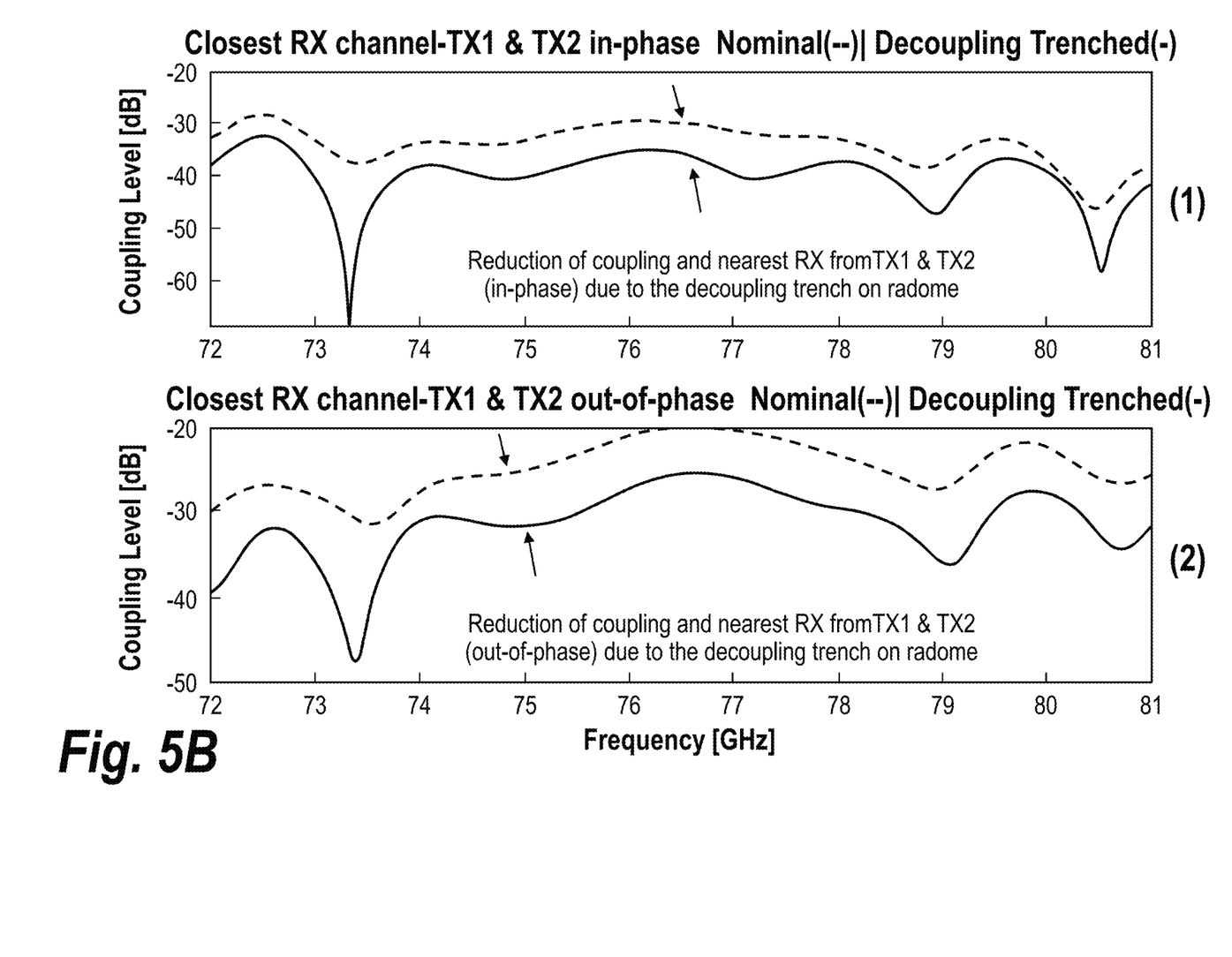

FIGS. 5A and 5B include graphs of experimental results of coupling level between antenna arrays versus frequency, illustrating the decoupling achieved by the technology of the disclosure. Each of FIGS. 5A and 5B includes two graphs, labeled graph (1) and graph (2). Each of graphs (1) and (2) includes a dashed curve, which illustrates coupling level with respect to frequency without the coupling reduction of the present disclosure, and a solid curve, which illustrates coupling level with respect to frequency with the coupling reduction of the present disclosure. In each graph, the difference in height between the dashed and solid curves illustrates the improvement in coupling reduction obtained by the technology of the present disclosure.

Referring to FIG. 5A, graph (1) illustrates the coupling reduction between the receive Rx array 116 closest to the transmit array TX1 114, and graph (2) illustrates the coupling reduction between the receive Rx array 116 closest to the transmit array TX2 112. The graphs of FIG. 5B illustrate coupling reduction between Rx array 116 and a combination of transmit arrays TX1 and TX2 transmitting in phase and out of phase. Specifically, curve (1) illustrates the in-phase case, and curve (2) illustrates the out-of-phase case.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A radar sensor module, comprising:
   a substrate;
   at least one transmit patch antenna array formed on a surface of the substrate, the transmit patch antenna array comprising a plurality of transmit antenna patches disposed along a transmit array axis;
   at least one receive patch antenna array formed on the surface of the substrate, the receive patch antenna array comprising a plurality of receive antenna patches disposed along a receive array axis;
   a radome over the surface of the substrate and the at least one transmit patch antenna array and the at least one receive patch antenna array, such that a gap is disposed between the surface of the substrate and an underside of the radome in which a portion of radiation emitted from the at least one transmit patch antenna array can propagate; and
   a trench formed in the underside of the radome to penetrate the underside of the radome and extend into the radome and being electromagnetically coupled to the gap, the trench extending along a trench axis between the transmit array axis and the receive array axis and extending uninterrupted between the plurality of transmit antenna patches and the plurality of receive antenna patches, the trench being sized, shaped and positioned with respect to the gap such that the portion of radiation emitted from the at least one transmit patch antenna array is substantially prevented from propagating toward the at least one receive patch antenna array.

2. The radar sensor module of claim 1, wherein the substrate is a printed circuit board (PCB).

3. The radar sensor module of claim 1, wherein the trench is sized, shaped and positioned to act as a waveguide stub electromagnetically coupled to the gap, such that the trench is configured as an electromagnetic stop.

4. The radar sensor module of claim 1, wherein the trench is sized, shaped and positioned to act as a waveguide stub electromagnetically coupled to the gap, such that the trench is configured as an electromagnetic stop at an operating frequency of the radar sensor module.

5. The radar sensor module of claim 4, wherein the operating frequency of the radar sensor module is in the range of 76 GHz to 77 GHz.

6. The radar sensor module of claim 5, wherein the trench has a width of approximately 1 mm and a depth of approximately 1.8 mm.

7. The radar sensor module of claim 5, wherein the gap has a height of approximately 1 mm.

8. The radar sensor module of claim 5, wherein the radome has a thickness of approximately 2.5 mm.

9. The radar sensor module of claim 4, wherein the operating frequency of the radar sensor module is in the range of 76 GHz to 78 GHz.

10. The radar sensor module of claim 9, wherein the trench has a width of approximately 1 mm and a depth of approximately 1.8 mm.

11. The radar sensor module of claim 9, wherein the gap has a height of approximately 1 mm.

12. The radar sensor module of claim 9, wherein the radome has a thickness of approximately 2.5 mm.

13. The radar sensor module of claim 1, wherein the trench is positioned vertically over the surface of the substrate and laterally between the at least one transmit patch antenna array and the at least one receive patch antenna array.

14. The radar sensor module of claim 1, further comprising a second transmit patch antenna array formed on the surface of the substrate immediately adjacent to the at least one transmit patch antenna array.

15. The radar sensor module of claim 14, further comprising a second receive patch antenna array formed on the surface of the substrate adjacent to the at least one receive patch antenna array.

16. The radar sensor module of claim 15, wherein:
the first and second transmit patch antenna arrays form a group of transmit patch antenna arrays and the first and second receive patch antenna arrays form a group of receive patch antenna arrays; and
the trench is positioned vertically over the surface of the substrate and laterally between the group of transmit antennas and the group of receive antennas.

17. The radar sensor module of claim 1, wherein the radar sensor module is an automotive radar sensor module.

* * * * *